United States Patent [19]

Watson

[11] E Re. 29,067

[45] Reissued Dec. 7, 1976

[54] COMPACT FLATBED PAGE SCANNER

[75] Inventor: Hugh Alexander Watson, Berkeley Heights, N.J.

[73] Assignee: Bell Telephone Laboratories, Incorporated, Murray Hill, N.J.

[22] Filed: June 13, 1975

[21] Appl. No.: 587,118

[44] Published under the second Trial Voluntary Protest Program on March 2, 1976 as document No. B 587,118.

Related U.S. Patent Documents

Reissue of:

[64] Patent No.: 3,867,569
Issued: Feb. 18, 1975
Appl. No.: 445,051
Filed: Feb. 25, 1974

[52] U.S. Cl. ..... 178/7.1; 178/7.6; 178/7.88; 178/DIG. 27

[51] Int. Cl.[2] ..... H04N 1/10

[58] Field of Search ..... 178/DIG. 27, 7.1, 7.6, 178/7.88, 7.89

[56] References Cited

UNITED STATES PATENTS

| | | | |
|---|---|---|---|
| 3,011,020 | 11/1961 | Stamps | 178/7.6 |
| 3,512,129 | 5/1970 | Garfield | 340/146.3 |
| 3,523,160 | 8/1970 | Willey | 178/7.6 |
| 3,561,846 | 2/1971 | Kingsland | 250/219 |
| 3,562,426 | 2/1971 | Lavergne | 178/7.6 |
| 3,752,558 | 8/1973 | Lloyd | 178/7.6 |
| 3,761,744 | 9/1973 | Smith | 307/304 |
| 3,830,972 | 8/1974 | Siverling et al | 178/7.1 |

*Primary Examiner*—Howard W. Britton
*Attorney, Agent, or Firm*—Lucian C. Canepa

[57] ABSTRACT

A compact flatbed page scanner for facsimile transmission is described. The apparatus uses a linear charge coupled imaging device (CCID) for both light detection and electronic scanning across the width of the page. Compactness is achieved by folding the optical path from the scanned line to the CCID. A moving carriage below a horizontal glass plate supporting the document to be scanned carries: the linear CCID, a lens for focusing an image of one scanning line of the page onto the CCID, an assembly of bar mirrors for folding the path of the light beam from the scanning line to the lens, and tubular lamps for illuminating the scanning line. The motion of the carriage beneath the horizontal glass plate permits scanning an array of parallel lines, equally spaced over the length of the page. In the apparatus described, scanning a complete page may be performed from 4 seconds to several minutes, depending on the bandwidth available for transmission.

4 Claims, 4 Drawing Figures

COMPACT FLATBED PAGE SCANNER

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to the art of facsimile scanners, and particularly concerns apparatus for scanning graphic copy to produce corresponding electrical signals for transmission to a suitable graphic copy receiver.

2. Description of the Prior Art

Early scanners used for facsimile transmission have used a cylindrical drum around which the subject copy is wrapped, such as described in U.S. Pat. No. 3,561,846, issed Feb. 9, 1971 to D. O. Kingsland. The copy-carrying drunk is rotated and a photoelectric element is moved parallel to the axis of the rotating cylinder. The photoelectric element measures the light reflected from the subject copy along a succession of parallel scanning lines. However, since only separate sheets can be scanned on drum scanners, recent improvements have centered on flatbed facsimile scanners, which are more suitable for scanning pages in books, magazines, material mounted on stiff paper, and the like. For example, in one such scanner, rotating polygonal mirrors comprising individual reflecting surfaces have been employed to scan an optical beam across a page and reflect a spot image onto a stationary detector to provide fast side-to-side scanning. As the mirrors rotate, each mirror surface scans one line of information. Slow end-to-end scanning is obtained by mechanically moving the copy horizontally; see, e.g., U.S. Pat. No. 3,523,160, issued Aug. 4, 1970 to R. Willey. However, in such systems, as the light spot is deflected to the side of the page, it tends to become defocused, that is, blurred, distorted, and/or enlarged, because the distance from the rotating mirror to the page changes. This degradation becomes less severe as the distance from the page to the rotating polygon mirror is increased. However, an increase in the size of the scanner is required, and thus a compromise must be made between a small spot and a compact arrangement.

In other systems, a stationary wide-angle lens is used to focus an entire line or even a complete page onto a detector; see, e.g., U.S. Pat. No. 3,562,426, issued Feb. 9, 1971 to J. Lavergne. However, the distance between the document and the lens is dictated in part by lens geometry, and is typically on the order of 20 cm or more. Furthermore, with a stationary wide-angle lens, it is difficult to illuminate the page in such a manner that white areas at the ends and corners of the page produce the same signal level at the detector as white areas at the center of the page.

The distance between the document and a lens is also dictated by the size of the detector. Compactness of the facsimile scanner can be achieved where the detector has approximately the same dimensions as a scanned line, as disclosed in U.S. Pat. No. 3,512,129, issued May 12, 1970 to E. E. Garfield. There, the detector is a linear array of photocells. However, a linear array of conventional photocells, with typically 500 to 2000 individual cells and associated circuitry, is difficult and costly to produce and maintain and would be of relatively large size.

SUMMARY OF THE INVENTION

In accordance with the invention, a compact flatbed page scanner for facsimile transmission is provided with a detector employing a linear charge coupled imaging device (CCID). The CCID accomplishes light detection and electronic side-to-side scanning of a single line, hereafter called a scanning line. The device is considerably less than the width of the page in size. Compactness of the scanner is achieved by folding the optical path from the scanning line to the CCID. The document to be scanned is placed face down on a horizontal glass plate. A moving carriage below the glass plate is employed to permit scanning a succession of parallel lines equally spaced from one end of the page to the other. The carriage carries the linear CCID, a lens for focusing an image of one scanning line of the page onto the CCID, an assembly of long, narrow mirrors for folding the path of the light beam from the scanning line to the lens, and tubular lamps for illuminating the scanning line. In the apparatus described, scanning a complete page may be performed from 4 seconds to several minutes, depending on the bandwidth available for transmission.

DETAILED DESCRIPTION OF THE INVENTION

The invention and drawing are described in terms of an operational flatbed scanner. It should be understood that the dimensions and particular parameters given are merely exemplary.

Figure 1:
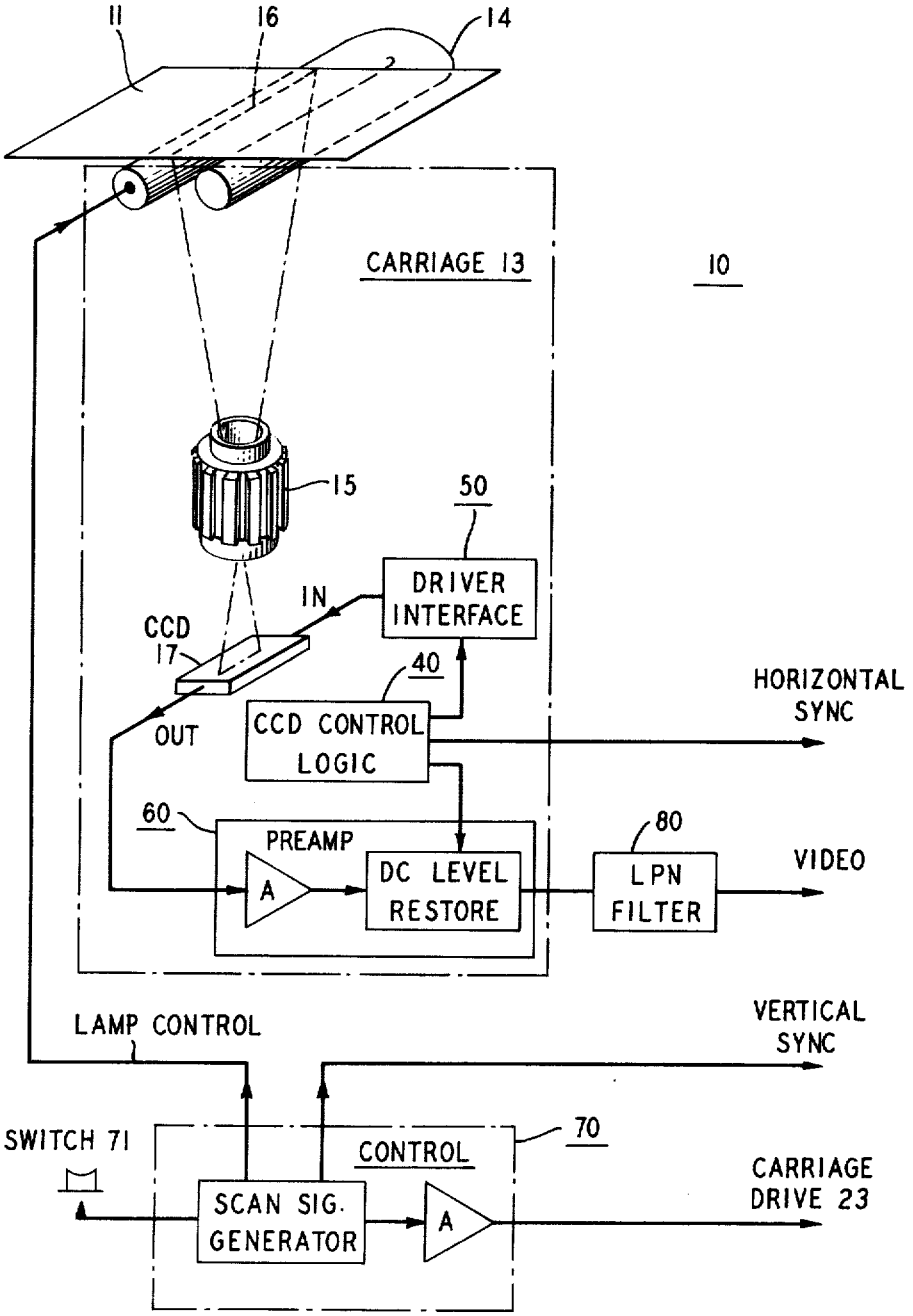
FIG. 1 is a partial schematic diagram of the flatbed page scanner, illustrating the associated electronic control and detection circuitry.
Figure 2:
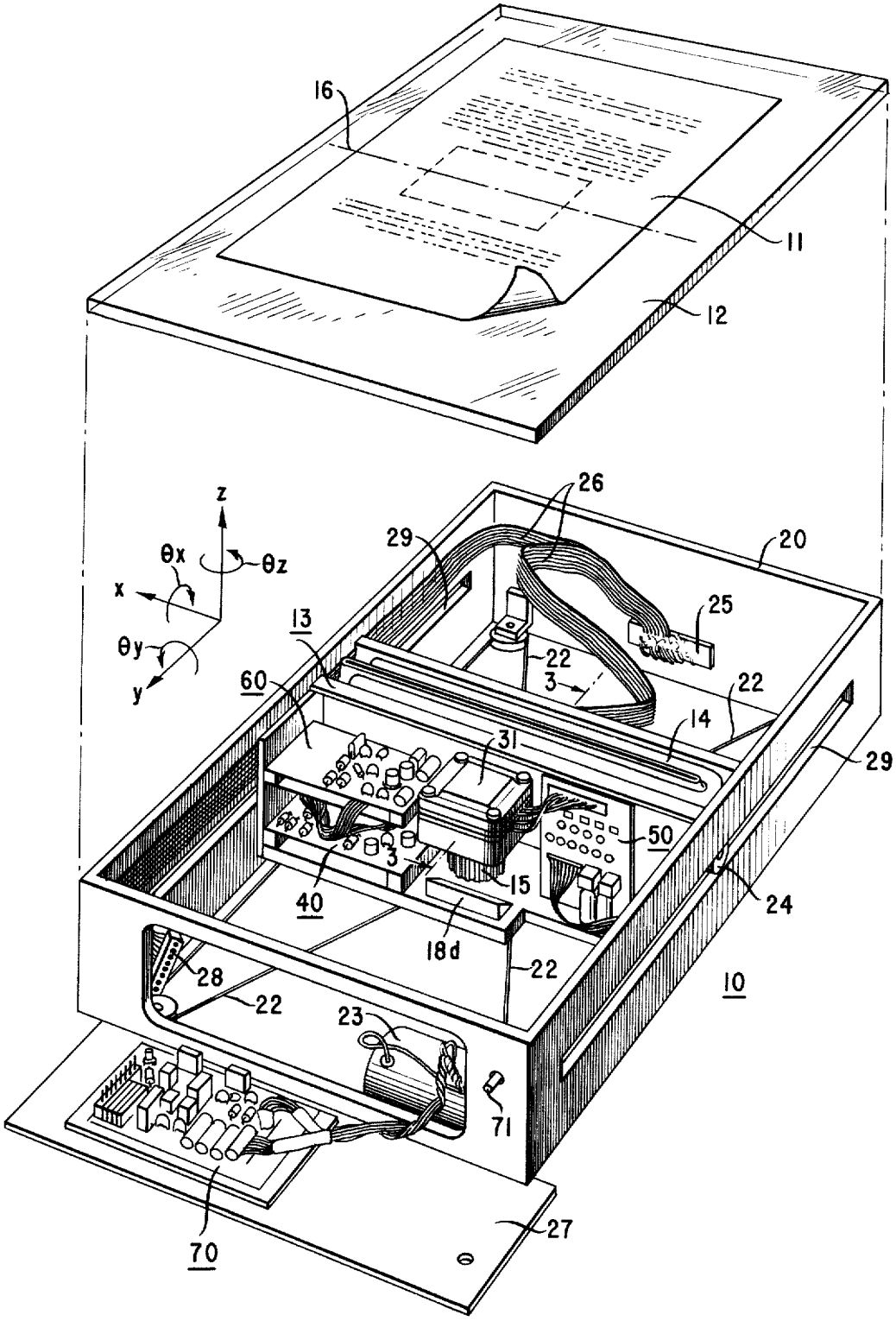
FIG. 2 depicts in perspective a partially exploded view of a compact flatbed page scanner, including a movable carriage, in accordance with the invention.
Figure 3:
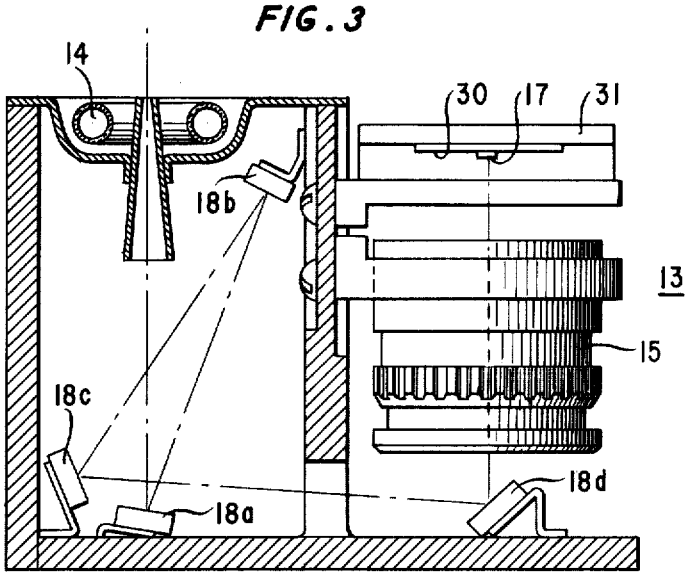
FIG. 3 in cross section along 3—3 of FIG. 2 is a detailed view of a portion of the movable carriage.

With reference to FIGS. 1 to 3, a description follows of the construction and performance of a compact facsimile scanner 10 for scanning a document 11 supported face down on a transparent (e.g., glass) plate 12 (FIG. 2). The transparent plate defines the approximate image plane of the document. A scanning assembly, or carriage 13, moves beneath the material to be copied and carries (a) lamps 14 for illuminating a portion of the material to be copied, or scanning line 16, (b) a detector 17 for receiving an image of the scanning line, (c) a lens 15 for focusing the image of the scanning line onto the detector, and (d) a plurality of bar mirrors 18a–d (FIG. 3) for folding the light path from the scanning line to the lens. The scanning assembly travels at a uniform speed in the direction of the length of the document so that a succession of equally spaced parallel lines can be scanned from one end of the document to the other while keeping the line being scanned at any instant focused on the detector.

In accordance with the invention, an integral feature of the inventive apparatus is the use of a linear charge coupled imaging device (CCID) 17 for detecting varying light intensity corresponding to a scanning line on the subject copy or material to be scanned, and for generating an analog electric signal that is representative of the light reflected from the page along the scanning line. The CCID device thus combines light detection and electronic scanning across the width of the document. Although not a necessary part of this description, the theory and operation of CCIDs described in Vol. 49, The Bell System Technical Journal. pp. 587–600 (1970). Basically, a CCID stores minority carriers (or their absence) in a spatially defined potential minimum at the surface of a homogeneous semiconductor and moves this charge about the surface by moving the potential minimum. The magnitude of the charge, which is proportional to the light intensity, is then detected at some location. A linear CCID with a number of potential minima, or elements, can be used to scan one entire horizontal line at a time. Mechanical motion can be employed to step or translate the line being scanned at any instant so that a succession of equally spaced parallel lines are scanned over the length of the subject copy, or document, to code the entire frame, making it analogous to a high-resolution area scanner. The number of elements comprising the CCID is constrained by (a) the minimum in the number of elements desired for high resolution and (b) the maximum in the number of elements allowed by the finite charge transfer efficiency that can be realized with the device technology, beyond which the number of elements cannot be increased without suffering a loss of image quality. Typically, the number of elements in a linear CCID used in accordance with the invention may vary from 750 to 2500.

For illustrative purposes, the detector 17 comprises a dual line gate linear imaging device, such as that shown in Vol. 9, Journal of Vacuum Science and Technology, pp. 1166–1181 (1972). This detector employs a four-phase 1500-element linear CCID, as described in further detail by G. E. Smith, in U.S. Pat. No. 3,761,744 issued Sept. 25, 1973. In the configuration of this detector, the light-generated charges are integrated on central depletion regions and simultaneously transferred laterally into two light-shielded shift registers, one on either side of the central region. The charges are then moved serially in each register, and along the two registers in parallel, to a common output.

The scanner scans 2000 lines along a 22 × 28 cm page (8½ inches × 11 inches) — a total of 3 million picture elements of 0.14 mm × 0.14 mm size on the original. The scanner may be easily modified to scan a 22 × 36 cm page (8½ inches × 14 inches). This is accomplished by making the glass plate 12 and the distance traveled by the carriage correspondingly longer. The nominal rate at which lines are scanned is about 160 lines/sec, requiring a 12.5 sec scanning time per 22 × 28 cm page using 160 kHz in video bandwith for transmission to remote receiving apparatus (not shown). The scanning speed can be increased with simple adjustments to 4 sec/page or decreased to several minutes per page to accommodate different transmission bandwidths.

The optical path from a single point on the scanning line 16 to the image of that point of the surface of the CCID 17 consists of a conical bundle of rays between the point on the scanning line and the lens 15 and a second conical bundle of rays between the lens 15 and the image of the point on the surface of the CCID. The totality of all such bundles of rays originating on the scanning line and passing through the lens aperture occupies a volume of space which is relatively flat and thin and which at no point is thicker than the lens aperture. Similarly, the totality of all bundles of rays passing through the lens aperture and incident upon the light-sensitive region of the CCID occupies a volume of space which is relatively flat and thin and which at no point is thicker than the lens aperture. By using relatively long and narrow mirrors to fold the optical path between the scanning line and the lens aperture and possibly by using mirrors to fold the optical path between the lens and the detector, the maximum dimensions of the carriage can be made relatively small. Thus, also in accordance with the invention, the optical path is folded by a plurality (e.g., four) front surface relatively long and narrow mirrors 18a–d, preferably of decreasing length to conserve space and weight, and directed to the lens 15 for focusing the scanning line 16 onto the linear CCID 17. The entire optics, illuminating lamp 14 and three electronic circuit boards are fully contained in the scanning assembly 13, which is a movable and enclosed carriage. In this example, the dimensions of the carriage are 8 cm (H) × 23 cm (W) × 11 cm (L); the dimensions of the four mirrors are about 1 cm (W) × 17 cm (L) (18a), 0.7 cm (W) × 13 cm (L) (18b), 1.5 cm (W) × 8 cm (L) (18c), and 2 cm (W) × 4 cm (L) (18d). The carriage is supported on a pair of tracks 29 by rollers 24 and translated along the tracks by a servomotor drive system 23 to obtain the end-to-end scan. The entire scanner is housed in a 10 cm (H) × 25 cm (W) × 43 cm (L) box 20 with a 22 cm × 28 cm glass window 11 on top.

External to the scanner box is an auxiliary box (not shown), having dimensions, for example, of 10 cm (H) × 25 cm (W) × 12 cm (L), which houses all of the necessary power supplies (not shown), low-pass notch filter 80 for properly conditioning the video signal, and various connections to remote controls and signalling. The auxiliary box can either be connected at connector 25 as a plug-in to the main scanner box or remotely from the main box using a multiple wire cable.

I. MECHANICAL DETAILS

The carriage is guided in the scanner box by a set of three-bearing rollers 24 to provide smooth rolling motion (y) with substantially no side-play ($\Delta_x$), bounce ($\Delta_z$), pitch ($\Delta\theta_x$) or roll ($\Delta\theta_y$). The movement of the carriage is controlled by a figure-eight cable loop 22 driven by a servomotor 23 with carriage position sensing. The cable is attached to the carriage on two sides to restrict play in the scan direction ($\Delta_y$) and to restrict carriage yaw ($\Delta\theta_z$). The drive pulley of the cable is threaded and locked to the cable to prevent slippage. The carriage position readout is a multiturn potentiometer (not shown) attached to the pulley shaft providing a linear one-to-one relationship of the potentiometer resistance to the carriage y-position. The pulley-potentiometer-shaft is driven by the miniature permanent magnet DC servomotor 23 via a worm gear set and a slip clutch. The slip clutch prevents damage to both the drive mechanism and the carriage in the event that the carriage motion is accidentally blocked. The worm gear set provides a compact, minimum play gearing system to reduce a high speed (6000 rpm) motor to the relatively low speed (30 rpm) pulley speed during scanning. The minimum travel time is about 4 sees, limited by the servomotor power supply capacity, and is used mainly for retrace.

2. OPTICS

An f/4 enlarging lens having a 28-mm focal length conveniently serves as the imaging lens 15. The 1500 element CCID 17 is 24 mm long and is located in the image plane. The length of the optical path from a 22 cm scanning line 16 to the lens is about 28 cm. However, as described earlier in accordance with one aspect of the invention, the optical path is folded to reduce the height of a flatbed scanner that would otherwise be required to accommodate a 28 cm optical path. In this embodiment, the path is folded by four mirrors 18a–d, which permits scanning assembly, or carriage, 13 to be reduced to a height of 8 cm. It will be appreciated, of course, that by a different arrangement of the mirrors, or by the use of additional mirrors, a further reduction in the height of the carriage 13 and scanner case 20 can be effected. Alternative means using a plurality of mirrors other than those shown in FIG. 3 for folding the optic path can easily be envisioned. Also, the mirrors may be of the focusing type, to eliminate lens 15, if desired.

The mirrors are conveniently aligned with a laser beam alignment jig and are bonded to the carriage frame 13. The linear CCID 17 is bonded to a mount 30 which is supported by a holder 31 (FIG. 3). Minor misalignment corrections can be achieved by sliding the mount 30 in the holder 31.

The scanning line 16 being imaged is illuminated by a cold-cathode warm white fluorescent lamp 14. The lamp is 8 mm in diameter bent into a U-shape. The lamp is excited by a 1000 V DC power supply (not shown) with a variable ballast resistor switchable (by a lamp control signal generated in control electronics 70) from 20 KΩ to 160 KΩ. A DC power supply is preferred, since it minimizes flicker usually associated with 60 hertz power supplies. The lamp is self-starting and normally idles at 3.5 mA of excitation current at a luminosity of 0.6 mW/cm$^2$ at the document. During the retrace and scanning cycle, a high voltage transistor is switched into the circuit and shorts out 140 KΩ of series resistor; this turns the lamp on to high intensity at a luminosity of 3.2 mW/cm$^2$ and draws 20 mA of current.

Shielding (not shown) is used so that only light reflected from the scanning line can enter the enclosed part of the carriage 13. Direct light from the fluorescent lamp and light reflected from the underside of the horizontal glass plate cannot enter the carriage.

By partially masking the fluorescent lamp near the middle of the scanning line, the illumination of the central part of the scanning line can be reduced below that at the ends of the scanning line in such a way that white areas at the ends of the scanning line produce the same signal level from the CCID as white areas at the center of the scanning line.

3. ELECTRONIC CIRCUITS

The major circuits are conveniently constructed on four circuit boards: the logic 40, driver 50, preamp 60 and control 70 boards. All boards are approximately 5 cm × 7.5 cm in size. The first three boards are mounted in the carriage 13. The movement of this carriage end-to-end by the servomotor permits scanning a succession of parallel lines over the length of the page. Interconnection of the circuit boards and lamp is made to external power supplies by cable 26, which terminates at connectors 25 and 28.

The function and performance of each board as employed in an opertional version of a compact flatbed page scanner constructed in accordance with the invention are now described. Details of the particular circuits would be readily apparent to the skilled worker in the art and hence are omitted.

a. Logic Circuit Board

Figure 4:
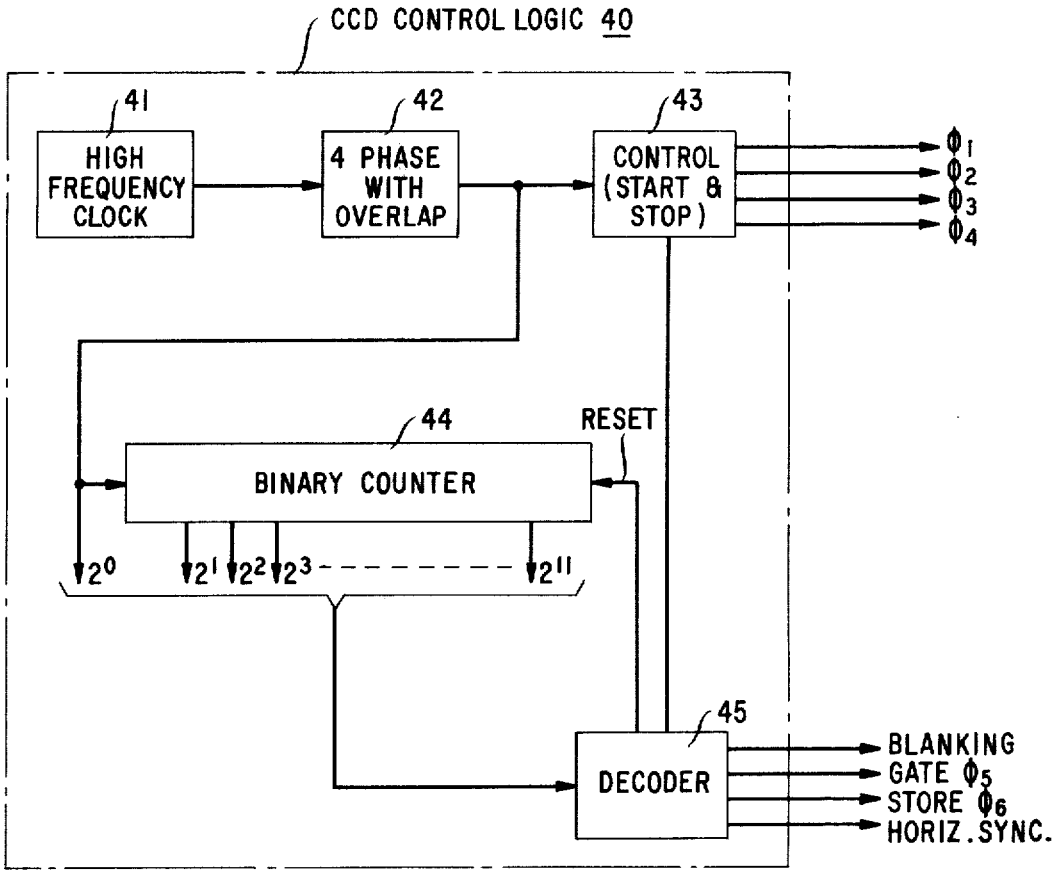
FIG. 4 is a functional block diagram of logic circuitry used to control a CCID.

The logic board 40 is constructed exclusively with digital TTL (transistor-transistor logic) electronics. As shown in FIG. 4, its function is separated into high frequency clock 41, four overlapping phase clock generators ($\phi_1$–$\phi_4$) 42, for sequentially biasing the scanning circuitry on the CCID 17, phase start-stop control 43, a binary counter 44 to count the number of clock doublets (four-phase/two-picture elements), and a decoder section 45 to start and stop certain events, such as video blanking, horizontal synchronization pulse (horiz sync), parallel-to-serial transfer gating ($\phi_5$), and image store gating ($\phi_6$) at proper timing sequences which are based on the contents of the binary counter. The Table below illustrates these events at corresponding clock counts.

Table

| Counter* | CCID Drive Pulse Timing Sequence Events |
|---|---|
| 0 | $\Phi_1 - \Phi_4$ running |
| 768 | Blanking pulse goes high ( → H) |
| 1024 | $\Phi_1 - \Phi_4$ stops at (L.H.H.L.) relative phase |
| | Parallel-to-serial gate ($\Phi_5$) → H |
| 1025 | Image store pulse ($\Phi_6$) → L |
| 1027 | $\Phi_5$ → L |
| | Horizontal sync pulse → L |
| 1028 | Reset pulse on — resets counter to 0 (cycle repeats) |
| | $\Phi_1 - \Phi_4$ running |
| | Blanking pulse → L |
| | $\Phi_6$ → H |
| | Horizontal sync pulse → H |

*Note: Each count corresponds to the transfer of two picture elements for the 1500-element CCID Since all timing is referenced to the high-frequency clock, a change in scan speed is easily accomplished by a single adjustment of the clock frequency. In the event that extremely stable operation is required, the clock frequency can be derived from crystal oscillators. In the case of transmission of video on a high-speed synchronous digital channel, the high-frequency clock can be phase-locked to the channel clock.

b. Driver Circuit Board

Since the CCID is an MOS (metal-oxide-semiconductor) device, its driving signal levels are in general not compatible with the TTL signal levels of the logic circuit board. Also, in order to achieve maximum charge transfer efficiencies and minimum dark currents, most of these levels, $\phi_1$–$\phi_6$, must be individually fine-tuned in both high and low states. There are DC bias levels to the input gate, input diode, output gate, and output diode on the CCID which must also be optimized. All these functions are performed by the driver interface board 50. The drive amplifiers for the four clock phases are pnp-npn complimentary amplifiers capable of 30 V output into a 200 pF capacitor with a rise and fall time of about 20 nsec. The periods of the clock pulses are about 5 $\mu$sec.

c. Preamp Circuit Board

The preamp circuit board 60 serves the function of amplifying the relatively weak current arriving at the output terminal of the serial charge-transferring CCID. The input from the CCID output diode is AC capacitor-coupled to avoid problems associated with small signals (less than 10 mV into 2 MΩ) riding on large DC bias. Due to the AC coupling, the DC levels must be restored to give video fidelity. This is accomplished during the horizontal (side-to-side) retrace time when the signal output level is reduced to the background noise level.

d. Control Logic Board

The control board 70 controls the motion of the end-to-end scan servomotor drive 23. This board also generates vertical synchronization (vert sync) signals for external controls and synchronization. The board also intensifies the illuminating lamp 14 during scanning (normally, the lamp idles at low intensity, as previously described, to prolong life, reduce heat, and insure quick turn on to full intensity).

Scanning of the document is initiated by activation of the scan switch 71, which is conveniently mounted on one end of the scanner case 20, as shown in FIG. 2.

There are two modes of operation of the scanner. For each momentary contact of the scan pushbutton switch 71, the carriage cycles once. However, if the scan switch is held closed, the carriage can repeatedly scan the same page for the purposes of adjustment and initial setup and for producing multiple copies. A preset carriage position switch may also be employed to move the carriage to an adjustable preset position.

Upon closure of the scan switch by the operator after loading the document to be copied or transmitted, the scanner first starts a 4 sec retrace cycle (a fast slew from the bottom to the top of the page). This time could be used to preview the document being scanned so as to provide an opportunity for presetting video level and gain controls and for analyzing the spatial content of the document. These features have not been implemented in the model being described, however. The scanner carriage longitudinal position can also be operated in an external control mode for applications such as random access addressing. The scanning linearity is better than 1 percent.

4. LOW-PASS NOTCH FILTER

The low-pass notch (LPN) filter 80 (housed in the auxiliary box) is used at the output end of the video preamp to filter out the non-video clock signal feedthrough (nominally at about 185 kHz) on the top end of the video passband and also high-frequency noise outside the video passband. To eliminate clock feedthrough from the CCID without losing too much video bandwidth, the notch frequency is set on the clock frequency. Low-pass notch filters are described in detail elsewhere and do not form a part of the invention; see Vol. 51, Bell Laboratories Record, pp. 104–111 (April 1973).

5. PERFORMANCE

The scanner may communicate with various receivers, such as a laser microrecorder as described in D. Maydan-M. I. Cohen-R. E. Kerwin U.S. Pat. No. 3,720,784 issued Mar. 13, 1973. The scanner has also been connected to a storage display unit (Tektronics Type 611). The scanner provides sufficient resolution for scanning a typewritten page for display on either of these display systems.

Calculations have been made of the resolution obtainable with this scanner. These show that 6 pt spartan medium type (average lower case letter size 0.8 × 0.8 mm) is resolvable.

What is claimed is:

1. A compact flatbed scanner for facsimile scanning comprising:

a. a housing;

b. a transparent plate mounted on the housing for supporting material to be copied, the transparent plate defining the approximate image plane of the material to be copied;

c. a moving scanning assembly supported within the housing beneath the transparent plate, the scanning assembly comprising:

1. at least one lamp for illuminating at least a portion of the image plane, 2. a linear charge coupled imaging device for detecting variations in intensity of light reflected from a scanning line on the image plane and having electrical contacts adapted to provide electronic scanning over the length of the scanning line, and 3. an optical system for focusing the light reflected from the scanning line onto the linear charge coupled imaging device, the optical system comprising a plurality of long, narrow mirrors for folding the optical path from the scanning line to the linear charge coupled imaging device;

d. means for mechanically displacing the scanning assembly relative to the image plane in a direction parallel to the image plane and perpendicular to the scanning line to permit scanning a succession of parallel lines from one end of the image plane to the other; and e. electrical circuitry for sequentially reading out each scanning line detected by the linear charge coupled imaging device by forming an electrical signal representative of the variations in intensity of light reflected from the image plane along a succession of scanning lines.

2. A compact flatbed scanner for facsimile scanning comprising:

a. a housing;

b. a transparent rigid plate fixedly mounted on the housing for supporting material to be copied the transparent plate defining the approximate image plane of the material to be copied;

c. a moving scanning assembly and slidably mounted within the housing beneath the transparent rigid plate, the scanning assembly comprising a casing supporting;

1. a fluorescent lamp excited by a DC power-supply for illuminating at least a portion of the material to be copied, 2. a linear charge coupled imaging device for detecting variations in intensity of illumination from a scanning line on the image plane and having electrical contacts adapted to provide side-to-side scanning over the length of the scanning line, the linear charge coupled imaging device comprising from 750 to 2500 storage elements, 3. an optical system for focusing the light reflected from the scanning line onto the linear charge coupled imaging device, the optical system comprising (a) a plurality of long, narrow mirrors of decreasing length for folding the optic path by a factor of at least two, from the image plane to the linear charge coupled imaging device and (b) a lens for forming an image of the scanning line, and 4. electrical circuitry for sequentially reading out each scanning line detected by the linear charge coupled imaging device by forming an electrical signal representative of the variations in intensity of the light reflected from the image plane along a succession of scanning lines, the electrical circuitry comprising:
   i. logic circuitry for sequential read out of the variations in intensity of light incident upon the linear charge coupled imaging device,
   ii. interface circuitry between the logic circuitry and the linear charge coupled imaging device for forming signal levels compatible with the linear charge coupled imaging device and for biasing selected electrodes on the linear charge coupled imaging device, and
   iii. amplifying circuitry for amplifying signals generated by the linear charge coupled imaging device and which provide an analog measure of the intensity of light incident upon the linear charge coupled imaging device; and d. means for mechanically displacing the scanning assembly relative to the material to be copied in a direction parallel to the transparent rigid plate and perpendicular to the scanning line, to permit scanning a succession of equally spaced parallel scanning lines from one end of the image plane to the other.

*3. A compact flatbed scanner for facsimile scanning comprising:*

*(a) a housing;*

*(b) a transparent plate mounted on the housing for supporting material to be copied, the transparent plate defining the approximate image plane of the material to be copied;*

*(c) a moving scanning assembly supported within the housing beneath the transparent plate, the scanning assembly comprising:*

*(1) means for mounting at least one lamp for illuminating at least a portion of the image plane,*

*(2) a linear solid state imaging device for detecting variations in intensity of light reflected from a scanning line on the image plane and having electrical contacts adapted to provide electronic scanning over the length of the scanning line, and*

*(3) an optical system for focusing the light reflected from the scanning line onto the linear imaging device, the optical system comprising a plurality of long narrow mirrors for folding the optical path from the scanning line to the linear imaging device;*

*(d) means for mechanically displacing the scanning assembly relative to the image plane in a direction parallel to the image plane and perpendicular to the scanning line to permit scanning a succession of parallel lines from one end of the image plane to the other; and*

*(e) electrical circuitry for sequentially reading out each scanning line detected by the linear imaging device by forming an electrical signal representative of the variations in intensity of light reflected from the image plane along a succession of scanning lines.*

*4. A scanner as in clain 3 wherein said solid state device comprises a silicon device having multiple light-sensitive elements disposed in a linear array.*

* * * * *

UNITED STATES PATENT AND TRADEMARK OFFICE

CERTIFICATE OF CORRECTION

PATENT NO. : RE 29067

DATED : December 7, 1976

INVENTOR(S) : Hugh A. Watson

It is certified that error appears in the above-identified patent and that said Letters Patent are hereby corrected as shown below:

Column 1, line 23, "drunk" should read --drum--. Column 3, line 3, "electric" should read --electrically--. Column 3, line 8, "CCIDs described" should read --CCIDs are described--. Column 6, line 63, "drive" should read --driver--. Column 8, lines 53, 54 and 55, should be indented.

Signed and Sealed this

Twenty-second Day of March 1977

[SEAL]

*Attest:*

RUTH C. MASON
*Attesting Officer*

C. MARSHALL DANN
*Commissioner of Patents and Trademarks*